US011292408B1

(12) United States Patent
Hrevnack

(10) Patent No.: US 11,292,408 B1
(45) Date of Patent: Apr. 5, 2022

(54) VEHICLE BUMPER APPARATUS AND METHOD

(71) Applicant: John Robert Hrevnack, Middlesex, NJ (US)

(72) Inventor: John Robert Hrevnack, Middlesex, NJ (US)

( * ) Notice: Subject to any disclaimer, the term of this patent is extended or adjusted under 35 U.S.C. 154(b) by 0 days.

(21) Appl. No.: 17/500,085

(22) Filed: Oct. 13, 2021

(51) Int. Cl.
*B60R 19/44* (2006.01)
*B60R 13/01* (2006.01)
*B60J 11/06* (2006.01)

(52) U.S. Cl.
CPC ........... *B60R 19/44* (2013.01); *B60R 13/011* (2013.01); *B60J 11/06* (2013.01)

(58) Field of Classification Search
CPC .................................... B60R 19/44
USPC ..................... 293/142; 296/136.02
See application file for complete search history.

(56) References Cited

U.S. PATENT DOCUMENTS

| | | | | |
|---|---|---|---|---|
| 2,877,049 A | * | 3/1959 | Lucas | B60N 2/783 296/153 |
| 3,170,714 A | * | 2/1965 | Stalker | B60J 11/06 280/727 |
| 5,899,287 A | * | 5/1999 | Kadlubski | B60J 11/00 180/68.6 |
| 6,637,790 B2 | * | 10/2003 | Bio | B60R 19/44 293/142 |
| 2010/0276951 A1 | * | 11/2010 | Malina | B60R 19/44 293/142 |

* cited by examiner

Primary Examiner — Joseph D. Pape
(74) Attorney, Agent, or Firm — Walter J. Tencza, Jr.

(57) ABSTRACT

A vehicle bumper apparatus including a first material; a second material; a filling; and an attachment device. The first material may be connected to the second material such that the filling is between the first material and the second material, and a plurality of bumps are formed in the first material, and a plurality of bumps are formed in the second material. The attachment device may be attached to one of the plurality of bumps of the first material, wherein the attachment device is configured to attach the vehicle bumper apparatus to a vehicle so that at least part of the vehicle bumper apparatus covers a vehicle bumper and a rear vehicle outer wall. The attachment device may include hooks and/or loops configured to attach to loops and/or hooks on the vehicle. The attachment device, and the plurality of bumps of the first and second material may be elongated.

15 Claims, 6 Drawing Sheets

VEHICLE BUMPER APPARATUS AND METHOD

FIELD OF THE INVENTION

This invention relates to devices for vehicle bumper protection devices.

BACKGROUND OF THE INVENTION

There are various vehicle bumper protection devices known in the art.

SUMMARY OF THE INVENTION

In at least one embodiment of the present invention, a vehicle bumper apparatus is provided comprising: a first material; a second material; a filling; and an attachment device. The first material and the second material may be made out of the same material or a different material.

In at least one embodiment, the first material is connected to the second material such that the filling is between the first material and the second material, and a plurality of bumps are formed in the first material, and a plurality of bumps are formed in the second material.

In at least one embodiment, of the present application, the attachment device is attached to one of the plurality of bumps of the first material, and wherein the attachment device is configured to attach the vehicle bumper apparatus to a vehicle so that at least part of the vehicle bumper apparatus covers a vehicle bumper. In at least one embodiment, the attachment device includes hooks and/or loops configured to attach to loops on the vehicle.

In at least one embodiment of the present application, the attachment device is elongated, the plurality of bumps of the first material are elongated; and the plurality of bumps of the second material are elongated.

In at least one embodiment of the present application, a method is provided comprising the steps of: attaching a vehicle bumper apparatus to an inside wall of a vehicle trunk so that the vehicle bumper apparatus at least partially covers a vehicle bumper to thereby place the vehicle bumper apparatus into a first state with respect to the vehicle; and loading one or more objects into the vehicle trunk while the vehicle bumper apparatus is in the first state with respect to the vehicle; wherein the vehicle bumper apparatus may be configured as previously described.

The plurality of bumps of the first material and/or second material, and/or the plurality of seams between bumps is preferable in at least one embodiment because it allows the combination of the first material, second material and filling to be flexible to effectively bend or flex over an outer edge of open trunk of a vehicle, such as an automobile, to provide protection to a back or rear wall of a vehicle and/or a vehicle bumper, when loading objects into a trunk. The bumps provide firm protection and cushioning to keep the outer rear wall and/or the bumper of the vehicle from being damaged or scratched when loading objects into the trunk of the vehicle.

The vehicle bumper apparatus may have a width which is configured to span a width of a particular vehicle trunk opening such as a particular automobile trunk opening.

DETAILED DESCRIPTION OF THE DRAWINGS

Figure 1:
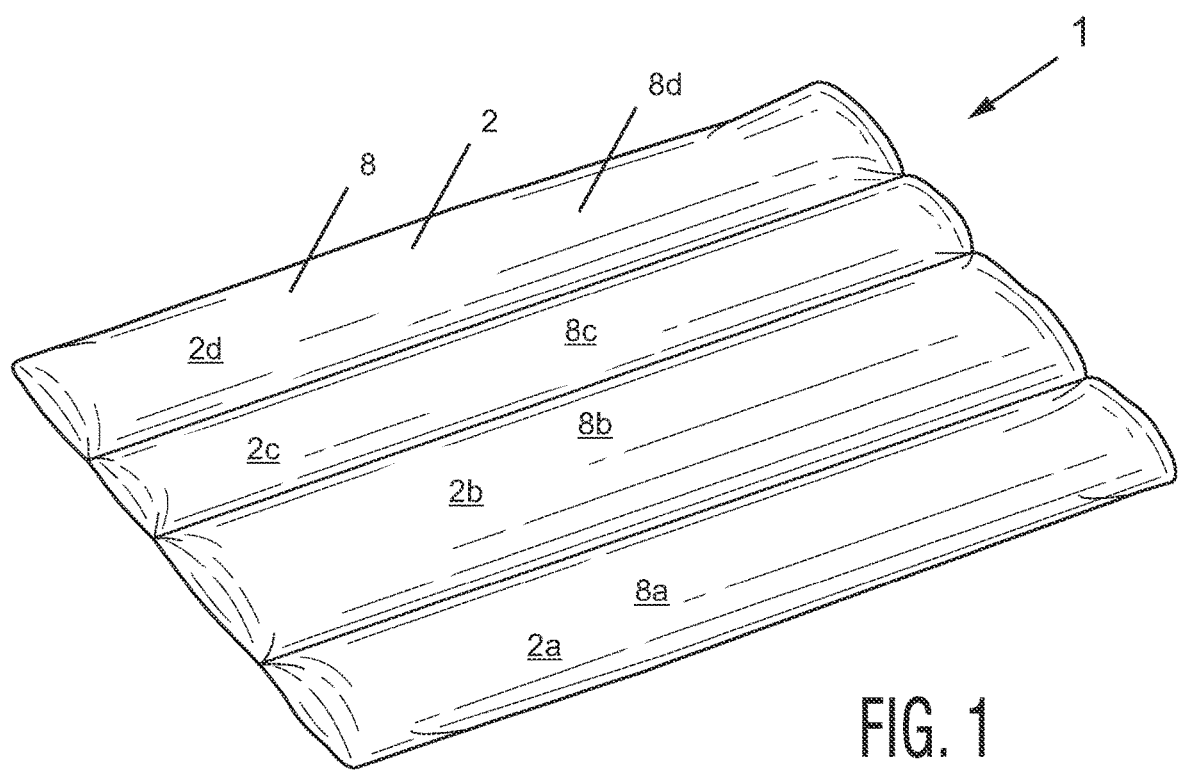
FIG. 1 is a front, top, and left perspective view of the vehicle bumper apparatus in accordance with an embodiment of the present invention.
Figure 2:
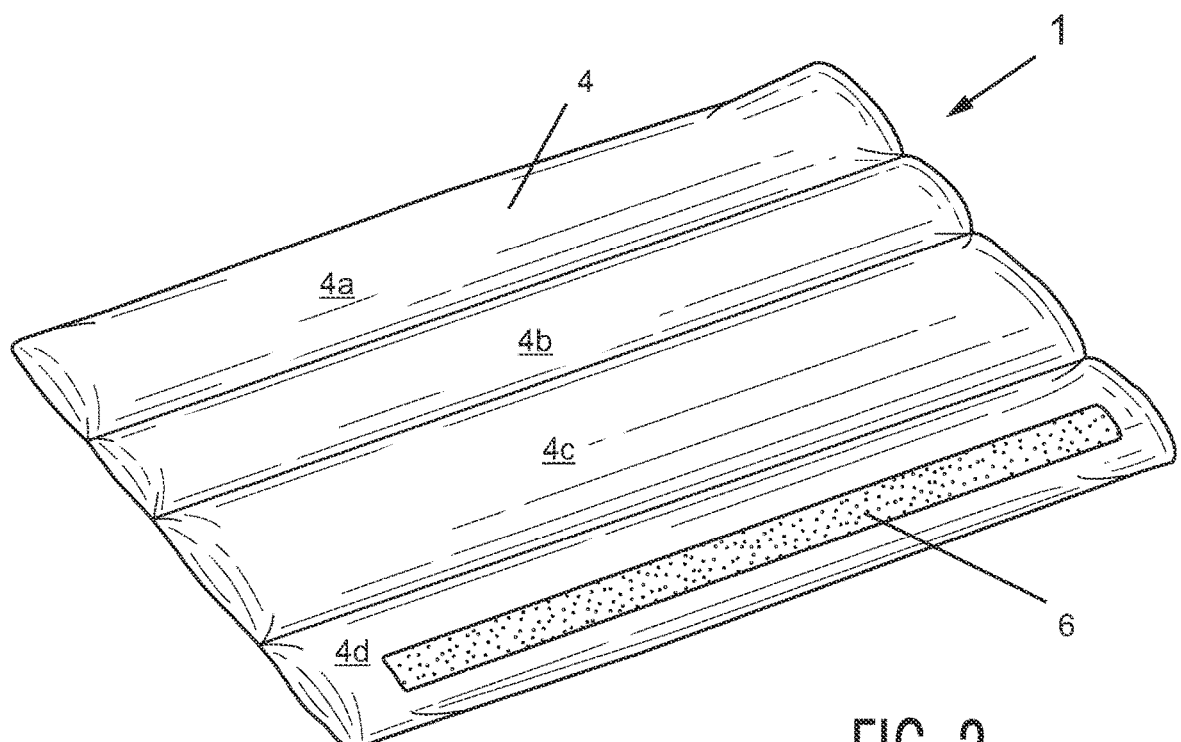
FIG. 2 is rear, bottom, and left perspective view of the vehicle bumper apparatus of FIG. 1.
Figure 3:
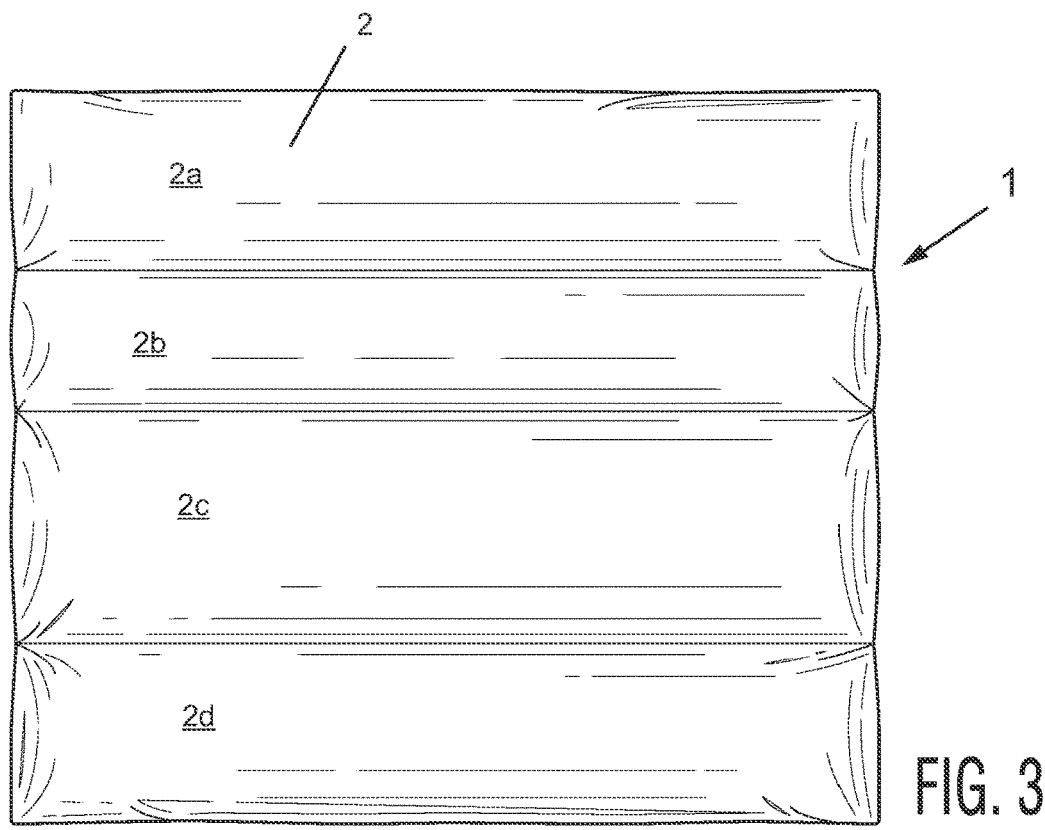
FIG. 3 is a top elevational view of the vehicle bumper apparatus of FIG. 1.
Figure 4:
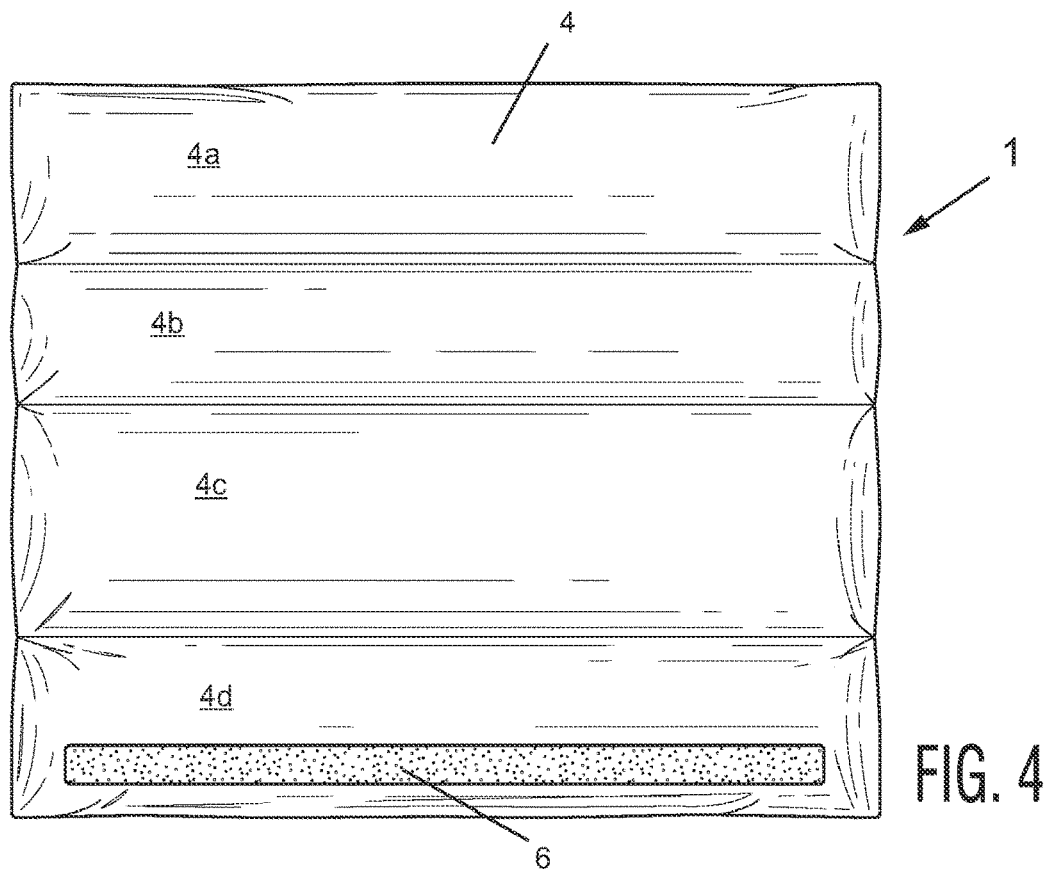
FIG. 4 is a bottom elevational view of the vehicle bumper apparatus of FIG. 1.
Figure 5:
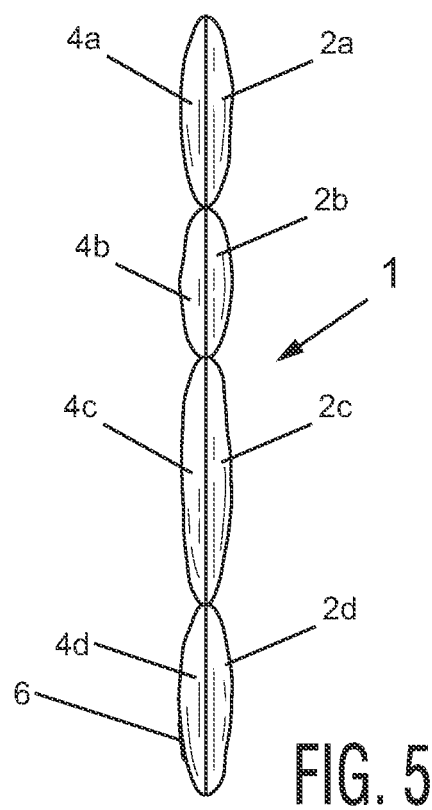
FIG. 5 is a left side elevational view of the vehicle bumper apparatus of FIG. 1.
Figure 6:
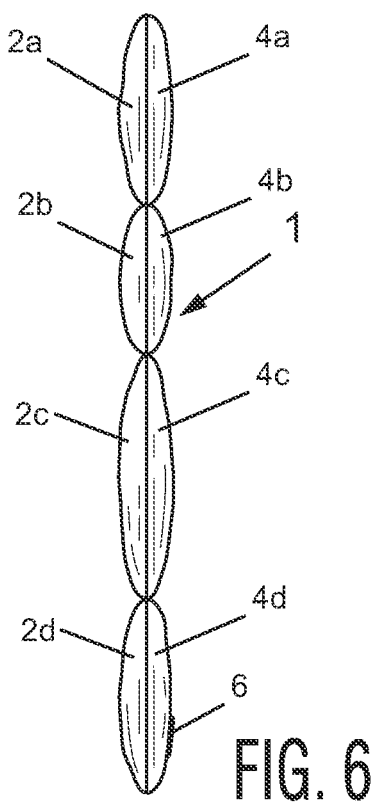
FIG. 6 is a right side elevational view of the vehicle bumper apparatus of FIG. 1.
Figure 7:
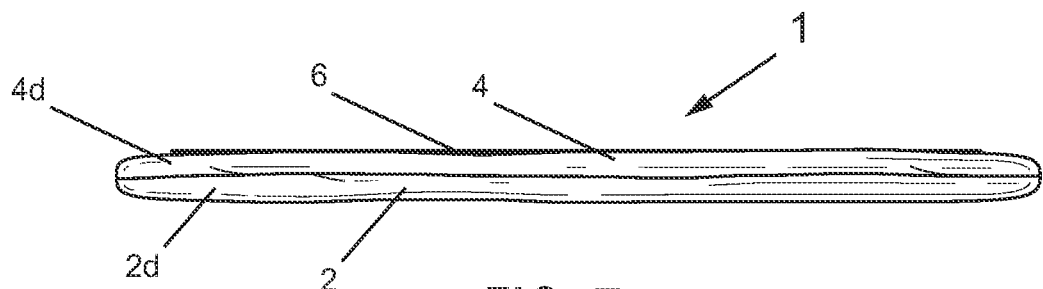
FIG. 7 is a rear elevational view of the vehicle bumper apparatus of FIG. 1.
Figure 8:
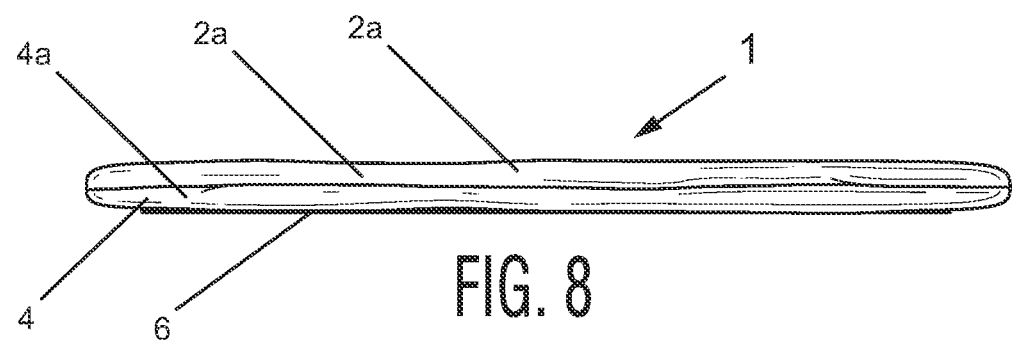
FIG. 8 is a front elevational view of the vehicle bumper apparatus of FIG. 1.

FIG. 1 is a front, top, and left perspective view of the vehicle bumper apparatus 1 in accordance with an embodiment of the present invention. FIG. 2 is rear, bottom, and left perspective view of the vehicle bumper apparatus 1 of FIG. 1. FIG. 3 is a top elevational view of the vehicle bumper apparatus 1 of FIG. 1. FIG. 4 is a bottom elevational view of the vehicle bumper apparatus of FIG. 1. FIG. 5 is a left side elevational view of the vehicle bumper apparatus of FIG. 1. FIG. 6 is a right side elevational view of the vehicle bumper apparatus of FIG. 1. FIG. 7 is a rear elevational view of the vehicle bumper apparatus 1 of FIG. 1. FIG. 8 is a front elevational view of the vehicle bumper apparatus 1 of FIG. 1.

Referring to FIGS. 1-8, the vehicle bumper apparatus 1 includes a top section or material 2, and a bottom section or material 4, which are sewn or otherwise connected together to form a plurality of top ridges, bumps, or protrusions 2a, 2b, 2c, 2d, and bottom ridges, bumps, humps or protrusions 4a, 4b, 4c, and 4d, wherein there is a filling 8, comprised of fillings 8a, 8b, 8c, and 8d, which is between the materials 2 and 4, such that fillings 8a-d are between materials 2a-d and 4a-d, respectively, and whose location is shown in FIG. 1, but which can only be seen from the outside of apparatus 1, unless the material 2 and/or 4 is transparent.

Figure 9:
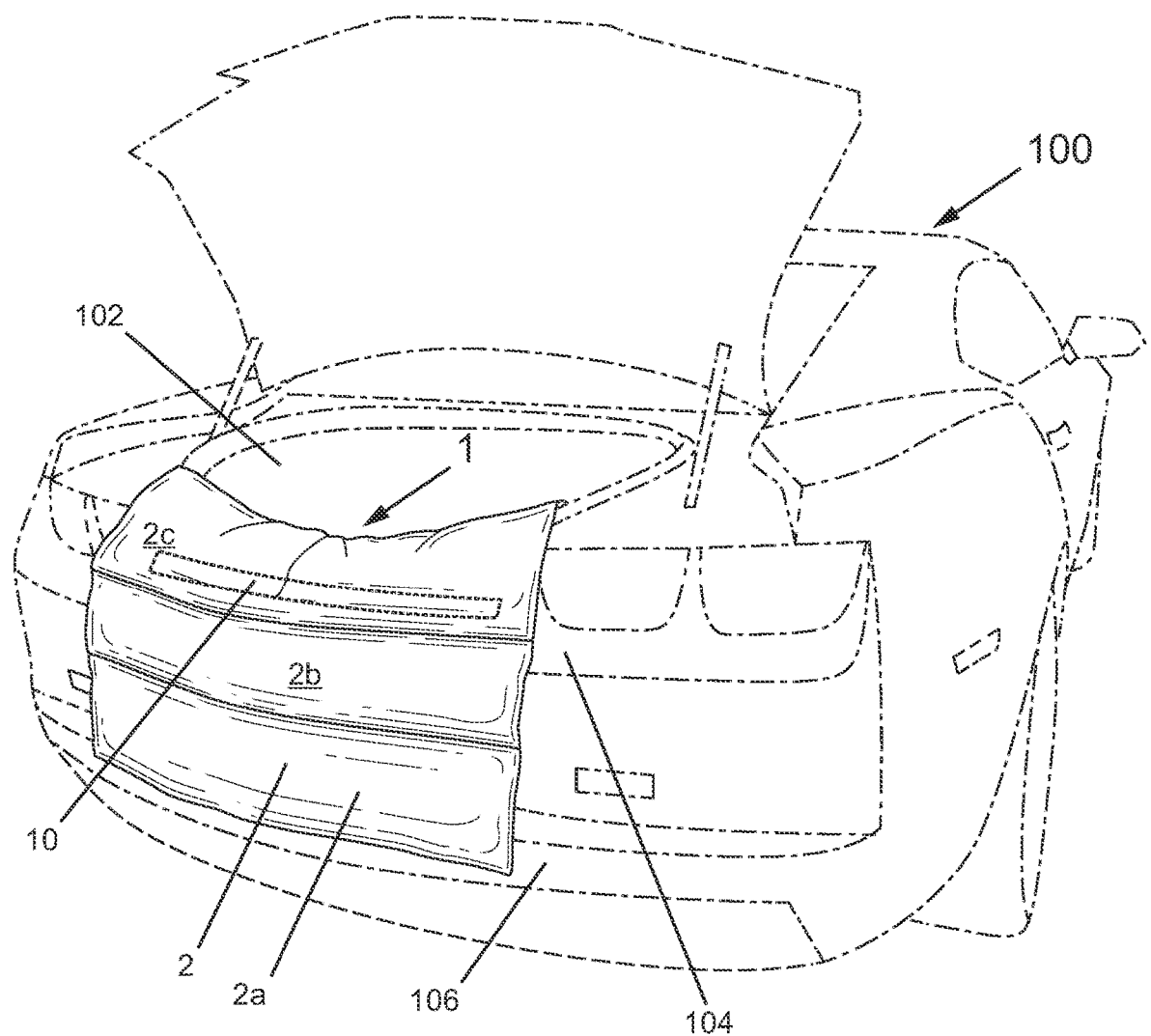
FIG. 9 is a perspective view of the vehicle bumper apparatus of FIG. 1 showing part of the top of the vehicle bumper apparatus of FIG. 1 draped over a vehicle bumper.

As shown, for example, in FIG. 2, the apparatus 1 includes a rectangular elongated section of Velcro (trademarked) and/or hooks and/or loops section which is configured to attached to the inside of a back wall 104 shown in FIG. 9, or to a Velcro (trademarked) loops and/or hooks section 10 (which is on the back wall or vehicle rear wall 104 of the trunk, inside of the trunk, and which cannot be seen in the view of FIG. 9, unless the apparatus 1 and the back wall 104 are transparent) of the truck of a vehicle, such as a truck 102 of a vehicle 100 shown in FIG. 9.

FIG. 9 is a perspective view of the vehicle bumper apparatus 1 of FIG. 1 showing part of the top of the vehicle bumper apparatus 1 of FIG. 1 draped over a vehicle rear wall 104 and bumper 106 of the vehicle 100, such as an automobile. The apparatus 1 is used for protecting the truck and the wall 104 and bumper 106 from damage, when loading material into the trunk 102. FIG. 9 shows in dashed lines the location of Velcro (trademarked) hooks and/or loops section 10, which cannot be seen in FIG. 9, unless the apparatus 1 and the wall 104 are transparent, but to which the section 6 would be attached. The section 6 of the apparatus 1 and the section 10 on the inside of the wall 104 overlap each other and are attached to each other in the configuration of FIG. 9. The section 6 and the section 10 may be the same shape and the same size or substantially the same shape and substantially the same size to allow for strong and extensive attachment between sections 6 and 10. It is preferred that the sections 6 and 10 be elongated and rectangular to provide substantial overlap and substantial attachment between the sections 6 and 10. The sections 6 and 10 may be mating Velcro (trademarked) sections and/or mating hooks and loops sections.

Figure 10A:
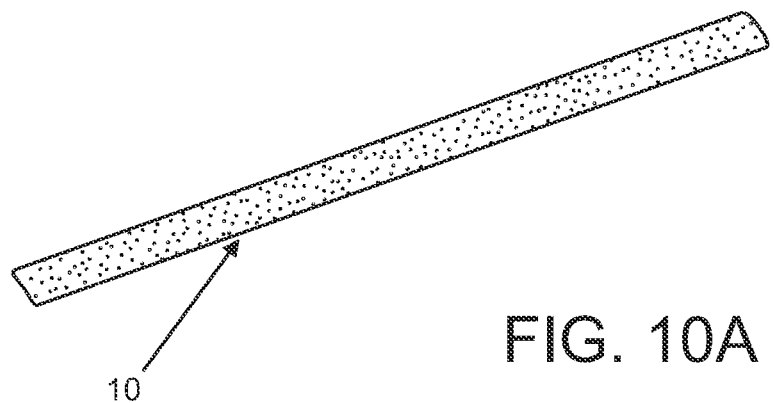
FIG. 10A is a top, front, and right perspective view of a section for attaching to a section of the vehicle bumper apparatus of FIG. 1.
Figure 10B:
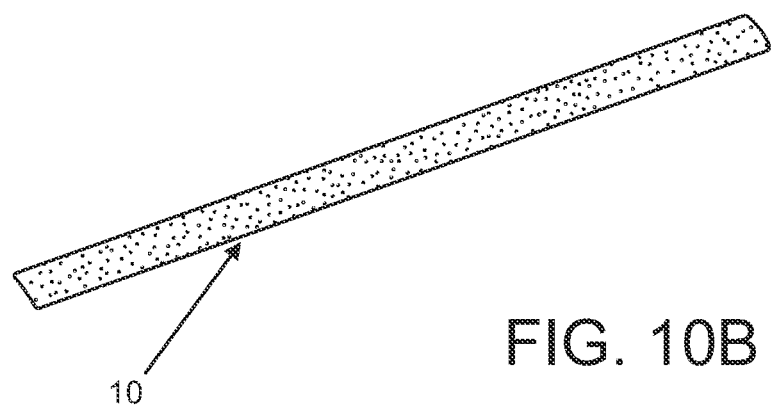
FIG. 10B is a bottom, rear, and right perspective view of the section of FIG. 10A.
Figure 10C:
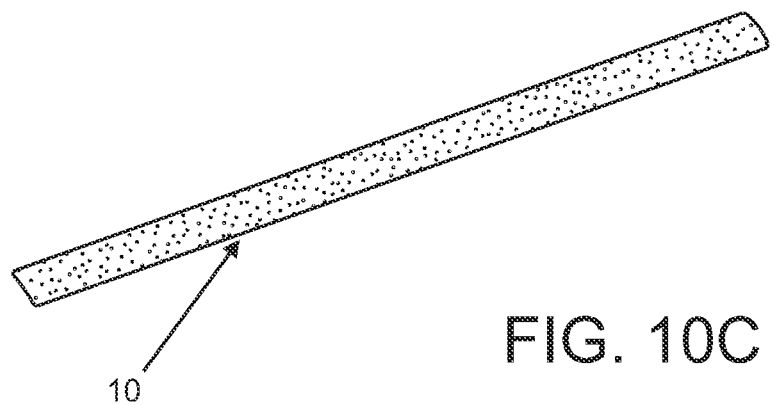
FIG. 10C is a bottom, front, and left perspective view of the section of FIG. 10A.

FIG. 10A is a top, front, and right perspective view of the section 10 for attaching to the section 6 of the vehicle bumper apparatus 1 of FIG. 1. FIG. 10B is a bottom, rear, and right perspective view of the section 10 of FIG. 10A. FIG. 100 is a bottom, front, and left perspective view of the section 10 of FIG. 10A.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A vehicle bumper apparatus comprising:
   a first material;
   a second material;
   a filling; and
   an attachment device that is elongated and has a length;
   wherein the first material is connected to the second material such that the filling is between the first material and the second material, and a plurality of bumps are formed in the first material, and a plurality of bumps are formed in the second material;
   wherein the attachment device is attached to a first bump of the plurality of bumps of the first material, and wherein the attachment device is configured to attach the vehicle bumper apparatus to a vehicle so that at least part of the vehicle bumper apparatus covers a vehicle bumper;
   wherein each of the plurality of bumps of the first material is elongated and has a length;
   wherein each of the plurality of bumps of the second material is elongated and has a length; and
   wherein the length of the attachment device spans the majority of the length of the first bump of the plurality of bumps of the first material; and
   wherein attachment device is attached to the first bump of the plurality of bumps of the first material so that the attachment device is fixed in a position in which the attachment device is completely overlapped by the first bump of the plurality of bumps of the first material.

2. The vehicle bumper apparatus of claim 1 wherein the attachment device includes hooks configured to attach to loops on the vehicle.

3. The vehicle bumper apparatus of claim 1 wherein the attachment device includes loops configured to attach to hooks on the vehicle.

4. The vehicle bumper apparatus of claim 1 wherein the plurality of bumps in the first material and the plurality of bumps in the second material provided cushioning continuously along a majority of the lengths of the plurality of bumps of the first material and along a majority of the lengths of the plurality of bumps of the second material.

5. The vehicle bumper apparatus of claim 2 wherein the attachment device includes a section of loops elongated along the majority of the length of the attachment device.

6. A method comprising the steps of:
   attaching a vehicle bumper apparatus to an inside wall of a vehicle trunk so that the vehicle bumper apparatus at least partially covers a vehicle bumper to thereby place the vehicle bumper apparatus into a first state with respect to the vehicle; and
   loading one or more objects into the vehicle trunk while the vehicle bumper apparatus is in the first state with respect to the vehicle;
   wherein the vehicle bumper apparatus is comprised of:
     a first material;
     a second material;
     a filling; and
     an attachment device that is elongated and has a length;
   wherein the first material is connected to the second material such that the filling is between the first material and the second material, and a plurality of bumps are formed in the first material, and a plurality of bumps are formed in the second material; and
   wherein the attachment device is attached to a first bump of the plurality of bumps of the first material, and wherein the attachment device is configured to attach the vehicle bumper apparatus to a vehicle so that at least part of the vehicle bumper apparatus covers a vehicle bumper in the first state;
   wherein each of the plurality of bumps in the first material is elongated and has a length;
   wherein each of the plurality of bumps in the second material is elongated and has a length; and
   wherein the length of the attachment device spans the majority of the length of the first bump of the plurality of bumps of the first material; and
   wherein attachment device is attached to the first bump of the plurality of bumps of the first material so that the attachment device is fixed in a position in which the attachment device is completely overlapped by the first bump of the plurality of bumps of the first material.

7. The method of claim 6 wherein the attachment device includes hooks configured to attach to loops on the vehicle.

8. The method of claim 6 wherein the attachment device includes loops configured to attach to hooks on the vehicle.

9. The method of claim 6 wherein the plurality of bumps in the first material and the plurality of bumps in the second material provided cushioning continuously along a majority of the lengths of the plurality of bumps of the first material and along a majority of the lengths of the plurality of bumps of the second material.

10. The method of claim 7 wherein the attachment device includes a section of loops elongated along the majority of the length of the attachment device.

11. The vehicle bumper apparatus of claim 3 wherein
the attachment device includes a section of hooks elongated along the majority of the length of the attachment device.

12. The method of claim 8 wherein
the attachment device includes a section of hooks elongated along the majority of the length of the attachment device.

13. The method of claim 6 wherein
attaching the vehicle bumper apparatus to the inside wall of the vehicle trunk, includes placing at least a majority of the length of at least one of the plurality of bumps in the first material on an outer edge of a trunk of a vehicle; and simultaneously attaching at least a majority of the length of the attachment device to the inside wall of the vehicle.

14. The method of claim 13 wherein
at least a majority of the length of the attachment device is attached to the inside wall of the vehicle by an elongated section of hooks spanning at least the majority of the length of the attachment device.

15. The method of claim 13 wherein
at least a majority of the length of the attachment device is attached to the inside wall of the vehicle by an elongated section of loops spanning at least the majority of the length of the attachment device.

\* \* \* \* \*